United States Patent [19]

Cioffi

[11] Patent Number: 5,218,482
[45] Date of Patent: Jun. 8, 1993

[54] ARTICLE WITH STRAP FOR MAGNIFYING FINGERNAILS AND TOENAILS

[76] Inventor: Victoria Cioffi, 4 Horizon Road, Apt. 1004, Fort Lee, N.J. 07020

[21] Appl. No.: 628,468

[22] Filed: Dec. 17, 1990

[51] Int. Cl.$^5$ .......................... G02B 27/02; G02B 7/02
[52] U.S. Cl. .................................. 359/802; 359/805; 359/808
[58] Field of Search ................. 350/235–251; 359/798–813, 896, 815, 818, 819, 827–830, 900

[56] References Cited

U.S. PATENT DOCUMENTS

| | | | |
|---|---|---|---|
| 463,168 | 12/1891 | Sayre | 359/812 |
| 1,025,057 | 4/1912 | Hampson | 359/815 |
| 1,584,519 | 5/1926 | Dritz | 359/815 |
| 1,944,567 | 1/1934 | Millington | 350/248 |
| 2,100,239 | 11/1937 | Carlton | 359/815 |
| 2,147,314 | 2/1939 | Percy | 132/73 |
| 2,541,760 | 2/1951 | Harrison | 350/248 |
| 2,771,003 | 11/1956 | Lyndall et al. | 350/248 |
| 3,428,286 | 2/1969 | Del Pesco | 350/474 |
| 3,774,993 | 11/1973 | Senee | 359/804 |
| 4,133,603 | 1/1979 | Inouye et al. | 350/248 |
| 4,190,322 | 2/1980 | Wortley | 350/420 |
| 4,930,871 | 6/1990 | Tannahill | 350/243 |

FOREIGN PATENT DOCUMENTS

| | | | |
|---|---|---|---|
| 722932 | 12/1965 | Canada | 350/248 |
| 221200 | 4/1910 | Fed. Rep. of Germany | 350/248 |
| 771402 | 10/1983 | France | 350/248 |

*Primary Examiner*—Bruce Y. Arnold
*Assistant Examiner*—Thong Nguyen
*Attorney, Agent, or Firm*—Mathews, Woodbridge & Collins

[57] ABSTRACT

An article for magnifying the visual image of a fingernail or toenail wherein the article comprises a supporting strap for removably securing the article to a hand or foot, a rod having one end connected to the supporting strap and the other end connected to a magnifying glass. The rod is used for positioning the magnifying glass in a magnifying relation to a fingernail or toenail on the hand or foot and leaves the user with the free use of at least one hand for examining or working on the magnified nail.

2 Claims, 5 Drawing Sheets

ARTICLE WITH STRAP FOR MAGNIFYING FINGERNAILS AND TOENAILS

FIELD OF THE INVENTION

This invention relates to an article which can be securely attached to a hand or foot for magnifying the visual image of a fingernail or toenail thereon which leaves the user with the free use of at least one hand to examine or work on the magnified nail.

BACKGROUND AND DESCRIPTION OF RELATED ART

Various articles have been devised which provide for a magnifying glass to be mounted to a stand or to a rod which can be attached to a hand. These articles are used to improve the user's visualization of small-sized working areas which are normally difficult to see and work with. For example, such devises are useful in threading needles, baiting a fishing hook, reading, knitting, etc. This problem is especially compounded for persons who are visually impaired.

U.S. Pat. No. 1,584,519 to Dritz discloses a magnifying lens supported by the hand of the operator. The invention incorporates an embracing loop attached to a rod. The rod extends perpendicular to an axis through each of the digital fingers (excluding the thumb). Connected angularly to the rod is a rigid rod extremity opposite the embracing loop. Attached to the rod extremity is a magnifying glass connected in a supporting rim and having a swivel connection. The rod can telescope toward and away from the hand, and rotate along the axis parallel to the plane through the digital fingers. The magnifying glass is not capable of being moved independently in each of the three dimensions. This article is designed for supporting a work magnifying lens by an operator. It is useful in stringing beads, working fine embroidery, or knitting. It is suggested that it could be useful for dental workers, doctors removing foreign objects from the eye, or closer examination of objects by jewelers, machinists, house workers and the like. However, it cannot be used to examine the fingernails of all of the fingers on the hand to which it is attached.

There are other disclosures showing a magnifying glass attached to fingers, such as, U.S. Pat. No. 4,930,871 to Tannahill which discloses a needle threader. As part of the assembly there is a magnifying lens mounted in a holder which is secured to a flexible mount having a ring portion for a person's finger. Additionally, there is wax holder for holding wax to be applied to the end of the thread. Also, U.S. Pat. No. 4,133,603 to Inouye et al. discloses a magnifying glass with a finger mount.

U.S. Pat. No. 3,428,286 to Pesco discloses an adjustable article holder that includes a socket interconnected to a base. The socket receives a ball that allows for universal adjustment. The article can be held and includes a magnifying glass assembly is secured on the user's finger. To locate the magnifying glass assembly, the socket is secured to a resilient loop through which the finger passes.

U.S. Pat. No. 1,944,567 to Millington is directed to an adjustable lens holder. The objective of this invention is to provide a holder that will allow the user to have complete use of the fingers while the lens is firmly in the hand and positively focused. The holder can be adjusted to fit different sizes of hands. The lens is connected to a loop-like segment which is placed over one of the fingers, preferably over the smallest or forth finger, of the hand and a rest serves as a support against the next finger. The lens is on the opposite end of the support.

U.S. Pat. No. 2,100,239 to Carlton discloses a magnifying glass which is flexibly attached to the thumb of the user. The magnifying glass does not interfere with the normal use of the hand and is connected to the finger by suitable means to enable the lens to be positioned for use to inspect something held in the palm of the hand to which the device is attached.

U.S. Pat. No. 2,771,003 to Lyndall et al. is directed to a magnifying glass arrangement. The magnifying glass is to be connected to the user's body, wherein the user can adjust the magnifying glass to adjust the distance between the magnifying glass and the user's eyes.

U.S. Pat. No. 2,541,760 to Harrison discloses a magnifying device adapted to be worn upon a person. The device is adapted to be readily available and not to be dropped accidentally. Its particular use is to enable fisherman to change flies, bait hooks and untangle lines without having to put reading glasses on. The magnifying device is to be pinned to the wearer's clothing in a suitable location so it may be used as needed.

U.S. Pat. No. 2,147,314 to Percy is directed to a manicuring table. The manicuring table is a single structure which allows the hand being manicured to be comfortably and more firmly supported during the time of the necessary manipulations. There is a means for illumination provided for and adjustable by the operator, as well as a means to magnify the hand and facilitate the work of the operator in inspection of the work as it is being done. The magnifying glass is connected to an upright section of the table through a flexible interconnecting means, thereby allowing the manicurist to adjust the magnifying glass over the hand being manicured.

U.S. Pat. No. 4,190,322 to Wortley is directed to mutually adjustable complementary magnifying elements, one of which can be on a flexible goose-necked type support arm.

As is evident from a study of the prior art, there are no magnifying articles which are to be attached to a person's hand or foot for the self-examination of a fingernail or toenail located on that same hand or foot.

Thus, there is a need in the art for such an article which can be attached to a user's hand or foot and which magnifies the visual image of a fingernail or toenail thereon, leaving the user with the free use of at least one hand for examining or working on the magnified nail.

SUMMARY OF THE INVENTION

The present invention relates to an apparatus and method for examining a fingernail or toenail.

The article of the present invention can be attached to a person's hand or foot and assists in the examination of a fingernail or toenail located on the same hand or foot. The article includes a magnifying glass for magnifying a visual image of the fingernail or toenail. In addition, the article includes means for supporting the magnifying glass on the hand or foot, and an adjustable connecting means for connecting the magnifying glass to the supporting means. Preferably, the magnifying glass can be moved independently in each of the three dimensions while remaining generally parallel to the face of the fingernail or toenail.

The present invention also relates to a method of visually examining a fingernail or toenail on a hand or a foot. The method of the invention comprises the steps of securing an article to a hand or foot, positioning the magnifying glass of the article in a magnifying relation to a fingernail or toenail, and visually examining the fingernail or toenail through the magnifying glass.

The present invention also relates to a method of rapidly examining all of the fingernails or toenails of a hand or foot. The method includes the above steps and further comprises the steps of moving the magnifying glass in an arcuate manner in order to sweep the magnifying means in a magnifying relation across the fingernails or toenails to view the same in a rapid manner.

The present invention provides the advantage of having a magnifying article which can easily be mounted on a person's hand or foot to facilitate the simple self-examination of a fingernail or toenail located on the same hand or foot.

Another advantage of the present invention is realized when the user is given free use of at least one hand in order to manicure, paint and examine the magnified nail.

The present invention is also very advantageous in assisting persons having visual impairments with the manicuring, painting and examination of fingernails or toenails.

A further advantage of the present invention is realized with a magnifying means which can easily be moved from a magnifying relation to one fingernail or toenail and placed in a magnifying relation to another fingernail or toenail on the same hand or foot without having to remove the article from the hand or foot to which it is attached.

DESCRIPTION OF THE PREFERRED EMBODIMENTS

The present invention will be understood by those skilled in the art by reference to FIGS. 1-5 which illustrate a preferred embodiment.

Figure 1:
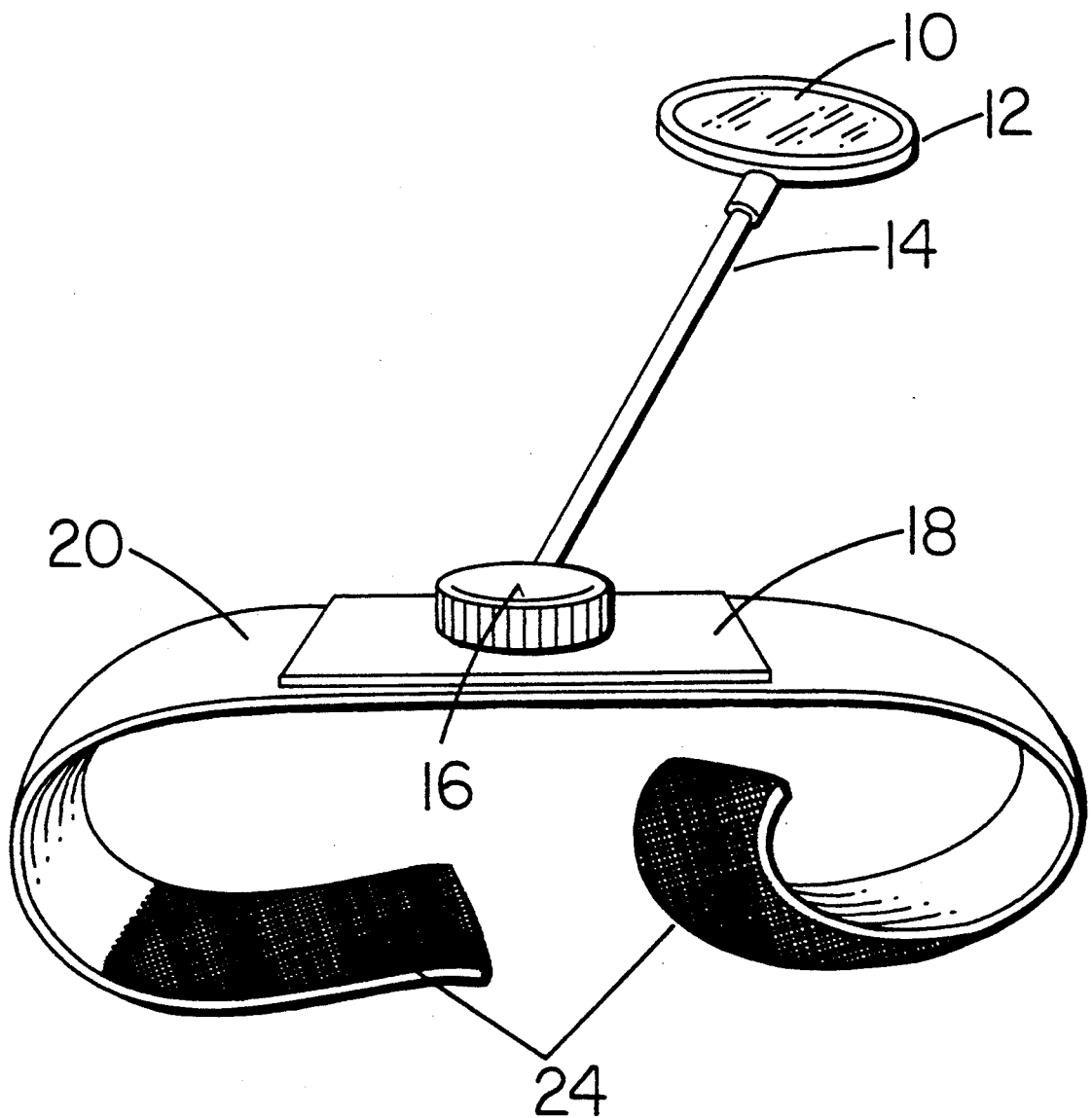
FIG. 1 is a perspective view of the article of the invention.

Referring to FIG. 1, an article according to the present invention has a magnifying means 10 securely mounted in a mount 12 which is connected to a supporting means 14. The connecting means 14 is connected to an adjustable supporting means 20 by a swivel means 16. The swivel means 16 is rotatably fixed to a plate 18 which is secured to the supporting means 20.

In one embodiment, the article of the invention can be easily and conveniently mounted on a person's hand. In an alternate embodiment, the article of the invention can be mounted on a person's foot. Preferably, the article of the invention can be mounted on a person's hand or foot. The mounting of the article can be accomplished by wrapping the supporting means 20 around the foot or hand, and securing the ends 24 of the supporting means 20 to each other in a manner disclosed below. Then, the user can position the magnifying means 10 in a magnifying relation to any desired fingernail or toenail on the same hand or foot by moving the connecting means 14 while simultaneously rotating the swivel means 16.

The magnifying means 10 may be made of glass, plastic or any other material capable of magnifying the visual image of an object. Glass is the preferred magnifying material, and for purposes of convenience, the magnifying means 10 will be hereinafter referred to as the magnifying glass 10.

The connecting means 14 is connected to the mount 12 which holds the magnifying glass 10. The connecting means preferably is of the rod-type. The rod 14 should be long enough in length to be able to extend from the supporting means 20, secured at a position on the hand or foot, to a position over, or in a magnifying relation to, a fingernail or toenail located on the same hand or foot. Preferably the rod 14 is approximately three inches to approximately seven inches in length to accommodate the hands of most persons.

In one embodiment, the rod 14 is made of a rigid material. The rod 14 should be of sufficient length to extend from the locus of support to a position over the fingernails or toenails.

In an preferred embodiment, the rod 14 is made of a pliable material. The term "pliable" is used to mean that the rod is capable of being shaped and of retaining that shape without returning to its original shape. When made of a pliable material, the rod 14 should be capable of assuming any desired configuration in order to position the magnifying glass in a magnifying relation to a fingernail or toenail located on the same hand or foot. Such pliable rods suitable for use in the present invention include, for example, a goose neck-type flexible rod, a series of rigid rods moveably interconnected with respect to each other, e.g., a telescoping rod, a bendable heavy-gage wire, or the like. Any conventional pliable rod capable of independent movement in each of the three dimensions can be used. That is, the rod must be capable of moving the magnifying glass in any of the three dimensions without necessarily moving in the other dimensions while allowing the magnifying glass to remain parallel to the face of the fingernail or toenail. A goose neck-type rod is preferred.

Although not necessary to the function of the invention, a swivel means 16 can be incorporated into the article. The swivel means 16 connects the rod 14 to the supporting means 20 and facilitates the arcuate or sweeping movement of the rod 14 with respect to the supporting means 20. A circular swivel means 16 is depicted in FIG. 1, however, a swivel means of any shape may be used. The swivel means 16 should be of sufficient rigidity for securing the rod 14 to the supporting means 20 while also providing the rod 14 with the capability of arcuate, or sweeping, movement. The swivel means 16 is joined to the plate 18 by any conventional manner which permits the swivel means 16 to rotate on the plate, such as, a ball and socket joint. However, the connection between the swivel means 16 and the plate 18 should provide enough resistance to movement to impede the free rotation of the swivel means 16 but allow the swivel means 16 to be rotated upon application of an external torsional force. This will ensure that the swivel means 16 will maintain a desired position with respect to the plate 18 during normal use.

The plate 18 is secured to the supporting means 20 by any means known in the art, such as, by gluing, sewing, riveting, etc. The plate 18 may be made of any flexible material capable of twisting and bending in order to conform to the shape of the surface of the hand or foot on which the supporting means 20 is secured.

Figure 2:
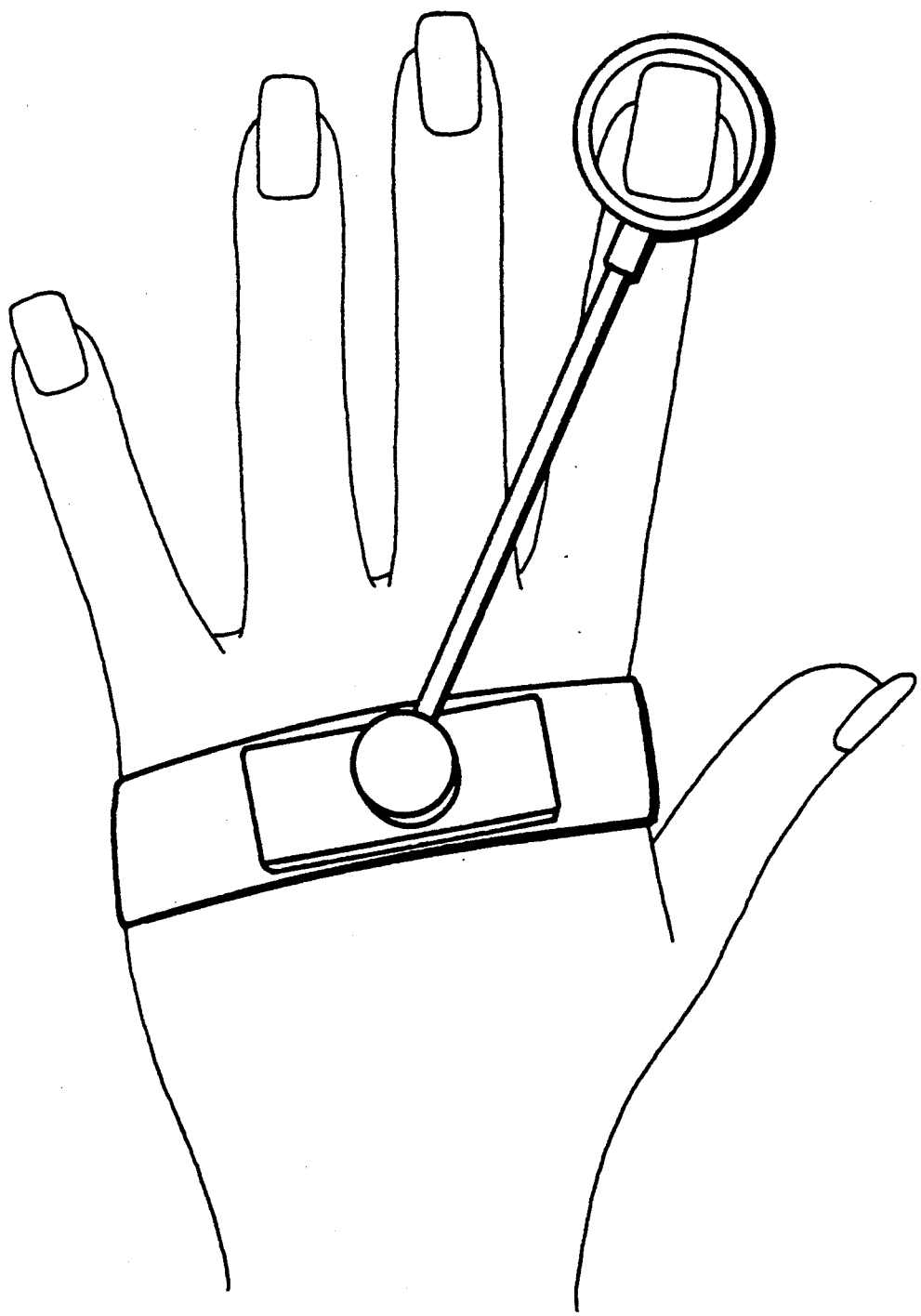
FIG. 2 shows a top plan view of the article of FIG. 1 when attached to the left hand, with the back of the hand as viewed by the user.
Figure 4:
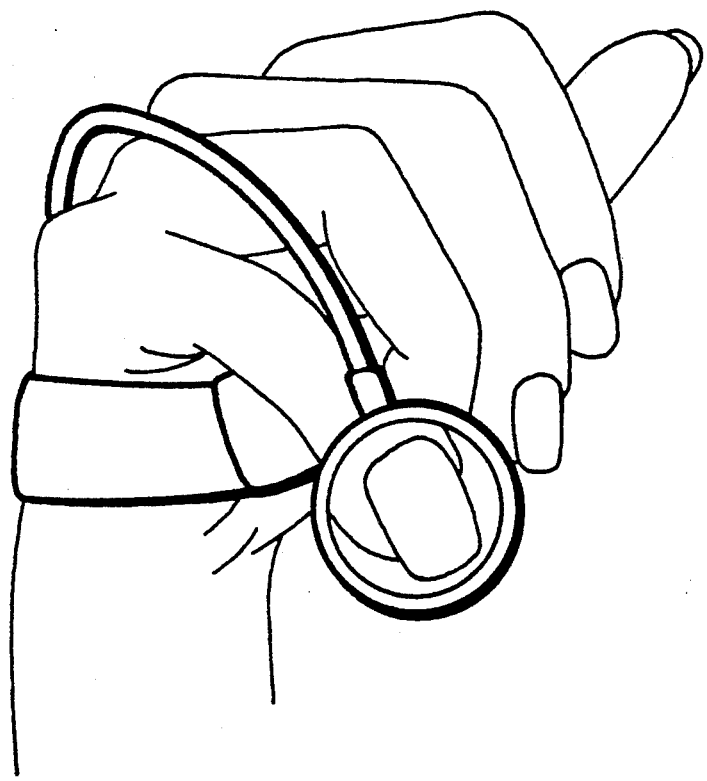
FIG. 4 shows a perspective view of the article of FIG. 1 when attached to the right hand, with the palm of the hand as viewed by the user.

The supporting means 20 is used to secure the magnifying article of the invention to various locations on the hand or foot. Various supporting means suitable for use in the present invention include a strap, a fingerless glove, an elastic circular band, e.g. a rubber band, a ring, or the like. Preferably, an adjustable strap is used, as depicted in FIG. 2. The article may be mounted on the back of a hand, or as shown in FIG. 4, the article may be mounted in the palm of the hand. The supporting strap 20 may be made of any flexible and durable material, for example, a cotton or cotton-blend fabric, or a plastic material. The supporting strap 20 includes adjustable coupling means 24 located at opposite ends of the strap 20. The supporting strap 20 and the coupling means 24 should be capable of accommodating a hand or foot of varying girth. The coupling means 24 suitable for use in the present invention include a buckle, a hook and loop arrangement (also known as Velcro ®),snaps or any other conventional means for coupling the ends of the strap 20 to each other. Preferably, Velcro ® is used for the coupling means.

Figure 3:
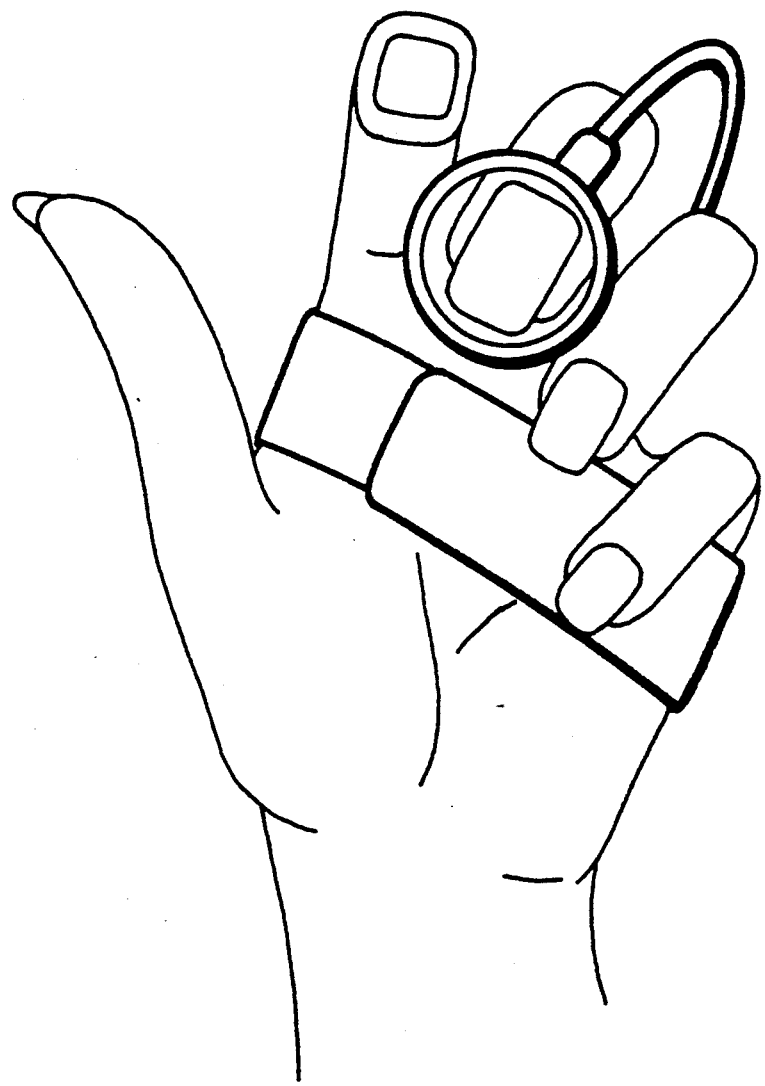
FIG. 3 shows a perspective view of the article of FIG. 1 when attached to the left hand, with the palm of the hand as viewed by the user.

FIGS. 2–4 show possible configurations of the article when attached to the hand as viewed by the user. The magnifying glass 10 is arranged to enlarge the visual image of the fingernail and may also be placed in a magnifying relation to any of the other fingernails without detaching the article from the hand. In addition, once the desired length of the rod 14 is set, the magnifying glass 10 may be quickly moved in an arcuate, or sweeping, manner across the adjacent fingernails in order to provide a quick examination of the nails. By this arrangement, the user is provided with the free use of the opposite hand for manicuring, painting, or examining the nail.

Figure 5:
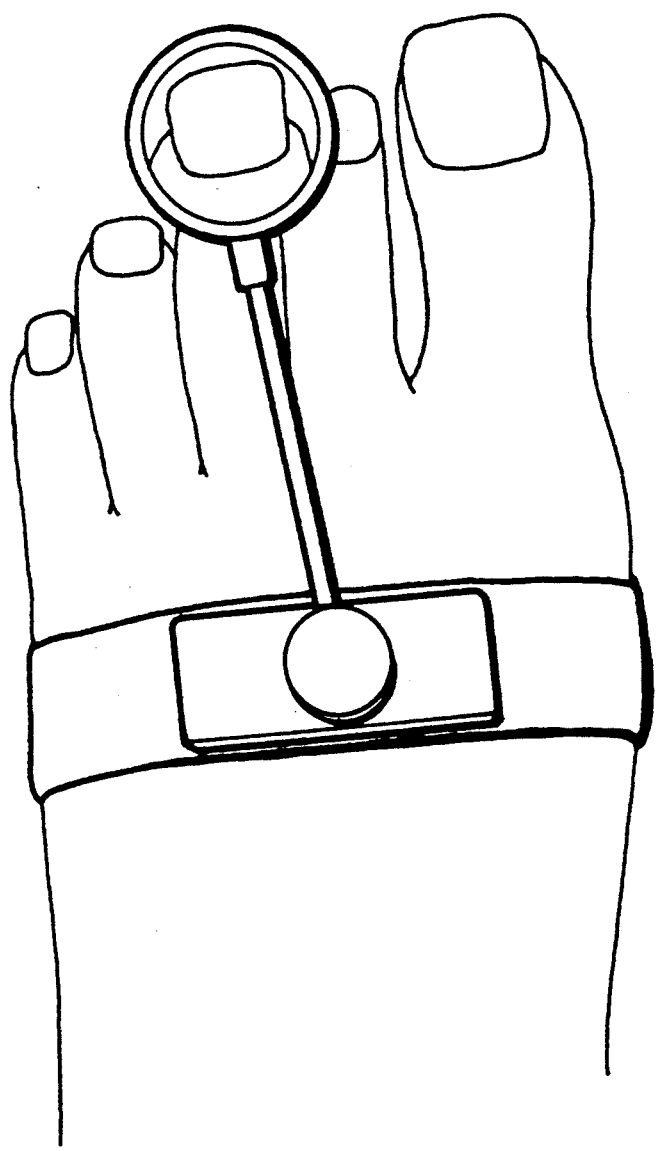
FIG. 5 shows a configuration of the article of the invention when attached to the left foot as viewed by the user.

FIG. 5 shows a configuration of the article of the invention when attached to the left foot as viewed by the user. The magnifying glass 10 is arranged to enlarge the visual image of the toenail and may also be placed in a magnifying relation to any of the other toenails without detaching the article from the foot. In addition, once the desired length of the rod 14 is set, the magnifying glass 10 may be quickly moved in an arcuate, or sweeping, manner across the adjacent toenails in order to provide a quick examination of the nails. By this arrangement, the user is provided with the free use of both hands for manicuring, painting or examining the nail.

While the magnifying article of the invention has been described as being attached to a hand or foot, it is contemplated that the article could also be attached to a wrist or ankle for examining fingernails or toenails located on the same member.

Having fully described the magnifying article of the invention, various other embodiments will occur to those of ordinary skill in the art and may be made without departing from the scope of the invention as defined in the appended claims.

What is claimed is:
1. A method which comprises the steps of:
   (i) securing a magnifying article to a hand;
   (ii) positioning the magnifying article in a magnifying relationship to at least one fingernail on the hand;
   (iii) visually examining the magnified image of the fingernail through the magnifying article; and
   (iv) sweeping the magnifying article to an adjacent fingernail.
2. A method which comprises the steps of:
   (i) securing a magnifying article to a foot;
   (ii) positioning the magnifying article in a magnifying relationship to at least one toenail on the foot;
   (iii) visually examining the magnified image of the toenail through the magnifying article; and
   (iv) sweeping the magnifying article to an adjacent toenail.

* * * * *